(No Model.) 5 Sheets—Sheet 3.
W. J. PERKINS.
SHINGLE MACHINE.
No. 561,278. Patented June 2, 1896.
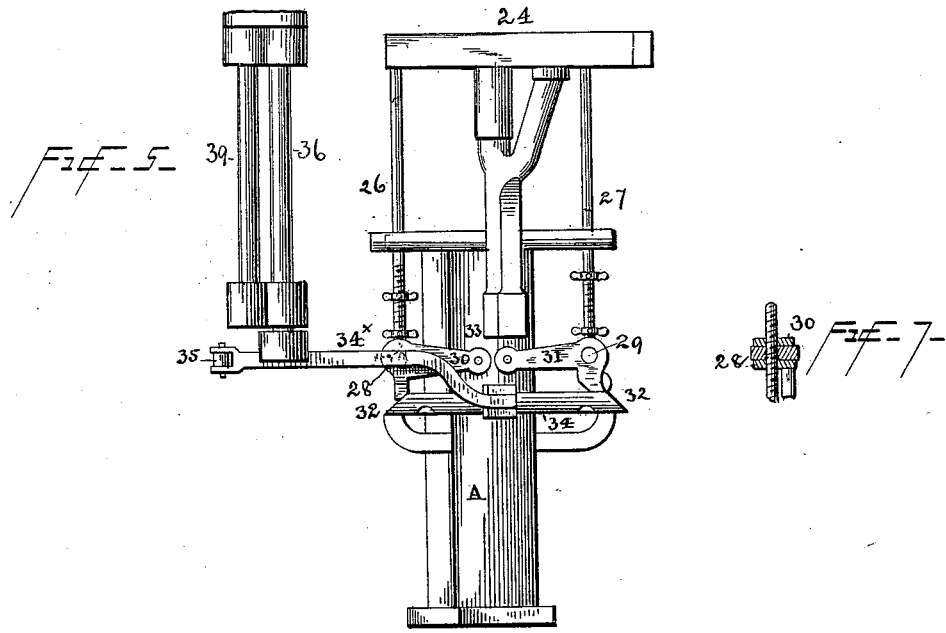
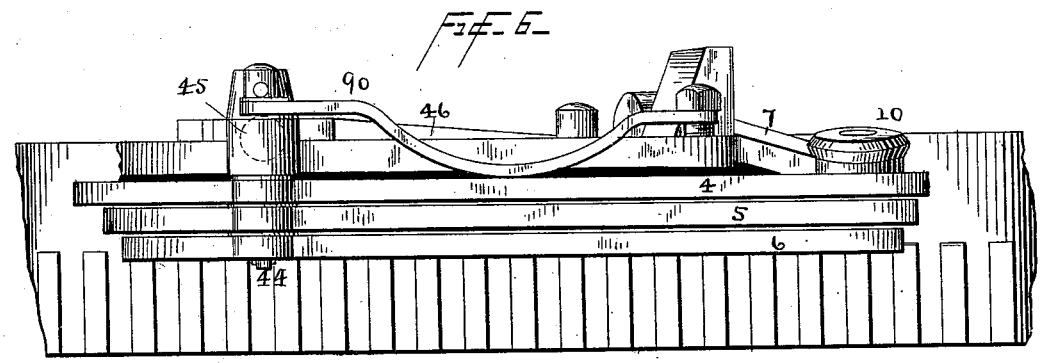
Witnesses
Norris A. Clark
L. M. Bartlett.
Inventor
W. J. Perkins.
By W. H. Bartlett
Attorney (No Model.)  5 Sheets—Sheet 4.

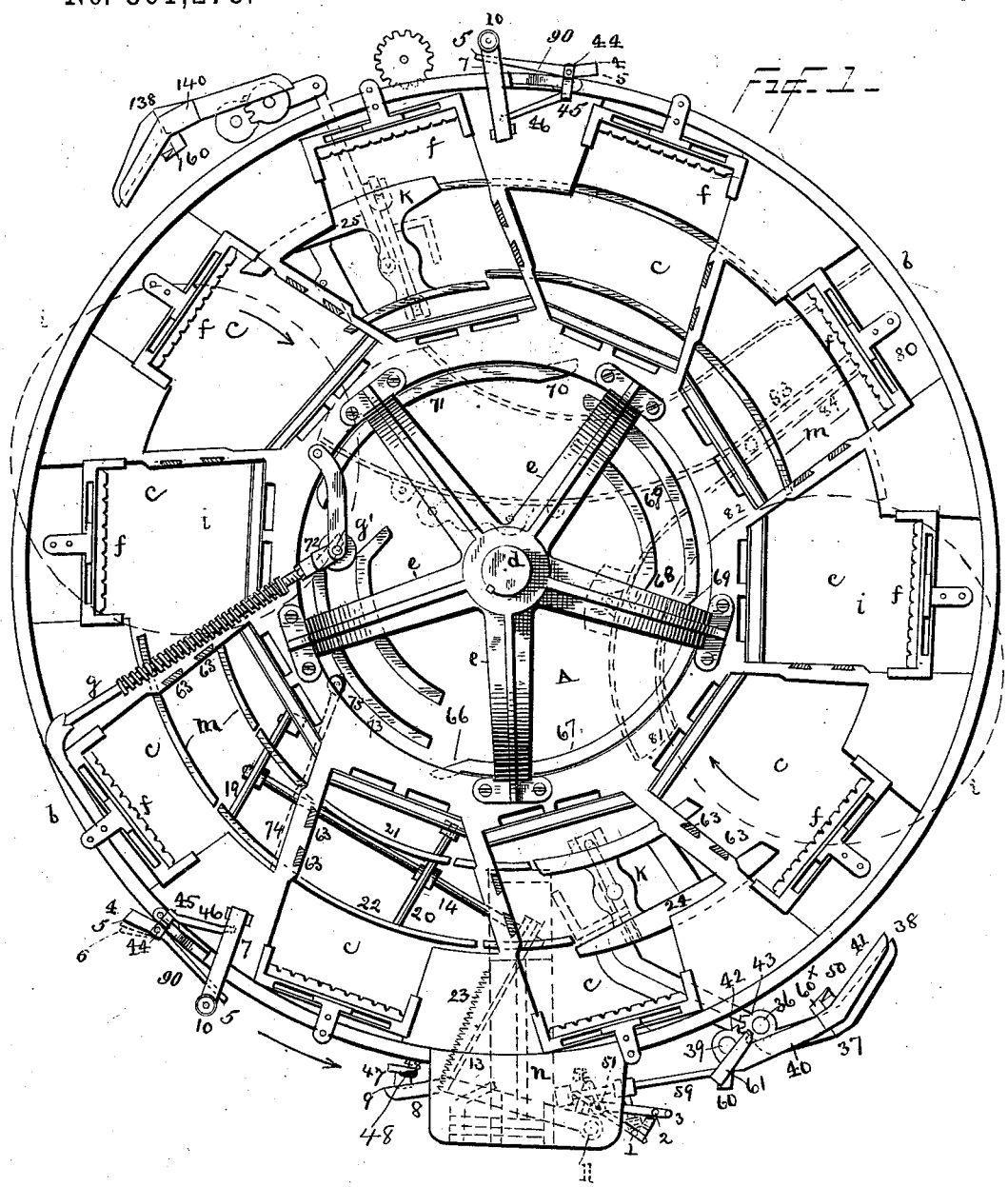

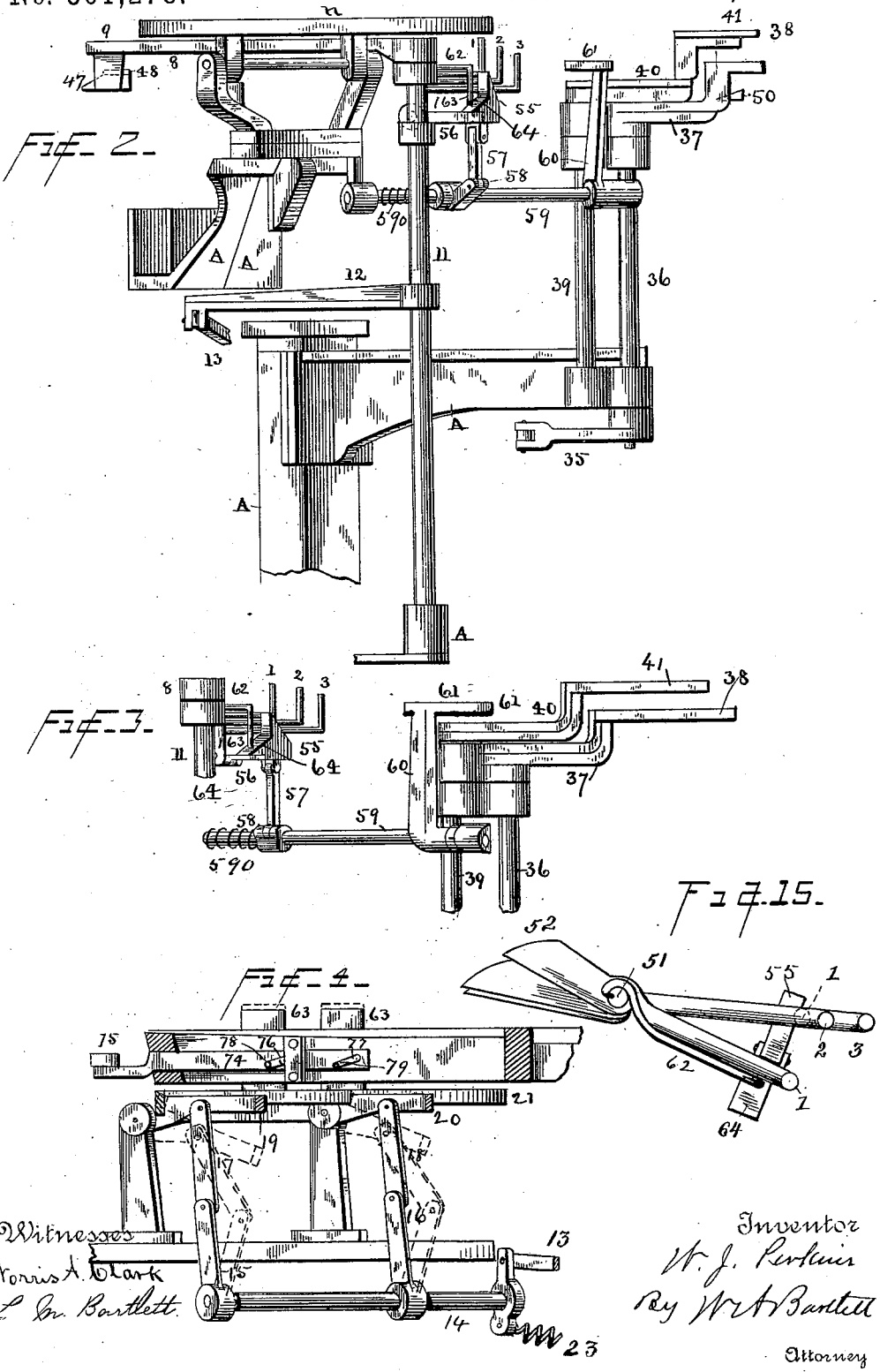

W. J. PERKINS.
SHINGLE MACHINE.

No. 561,278.  Patented June 2, 1896.

Witnesses
Norris A. Clark
L. M. Bartlett

Inventor
W. J. Perkins
By H. H. Bartlett
Attorney (No Model.) 5 Sheets—Sheet 5.

W. J. PERKINS.
SHINGLE MACHINE.

No. 561,278. Patented June 2, 1896.

Witnesses
M. P. McKee.
T. W. Johnson.

Inventor
Willis J. Perkins
By W. A. Bartlett
Atty.

UNITED STATES PATENT OFFICE.

WILLIS J. PERKINS, OF GRAND RAPIDS, MICHIGAN.

SHINGLE-MACHINE.

SPECIFICATION forming part of Letters Patent No. 561,278, dated June 2, 1896.

Application filed April 22, 1889. Serial No. 308,150. (No model.)

*To all whom it may concern:*

Be it known that I, WILLIS J. PERKINS, residing at Grand Rapids, in the county of Kent and State of Michigan, have invented certain new and useful Improvements in Shingle-Machines, of which the following is a specification, reference being had therein to the accompanying drawings.

This invention relates to shingle-sawing machines of the character which have a series of carriages, the carriages presenting the blocks or bolts to the saw successively. A rotary-carriage shingle-machine is a type of this class.

The object of the invention is to improve the working parts of a machine of this class, and especially to place each carriage or block holder under control of the operator, who may throw the working parts into such position that a predetermined movement of the blocks shall take place at the proper time without further attention.

The invention consists in improved mechanism for removing the spalts from the machine; also in mechanism for operating the tilt table or tables; also in mechanism for pushing the block forward onto the saw and to convey the sawdust from the machine; also in various details, combinations, and constructions of parts hereinafter explained.

Figure 8:
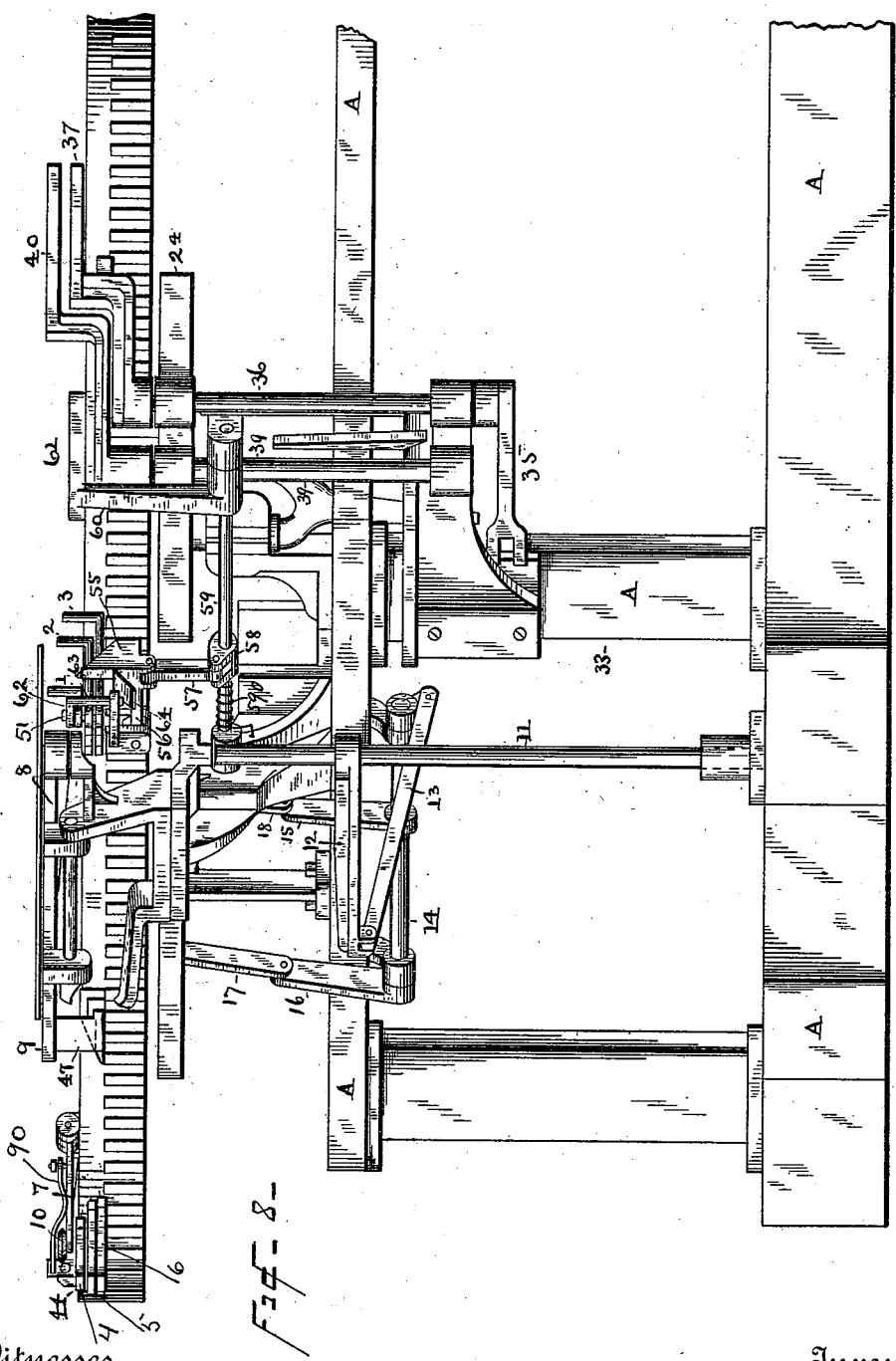
Figures 9, 10:
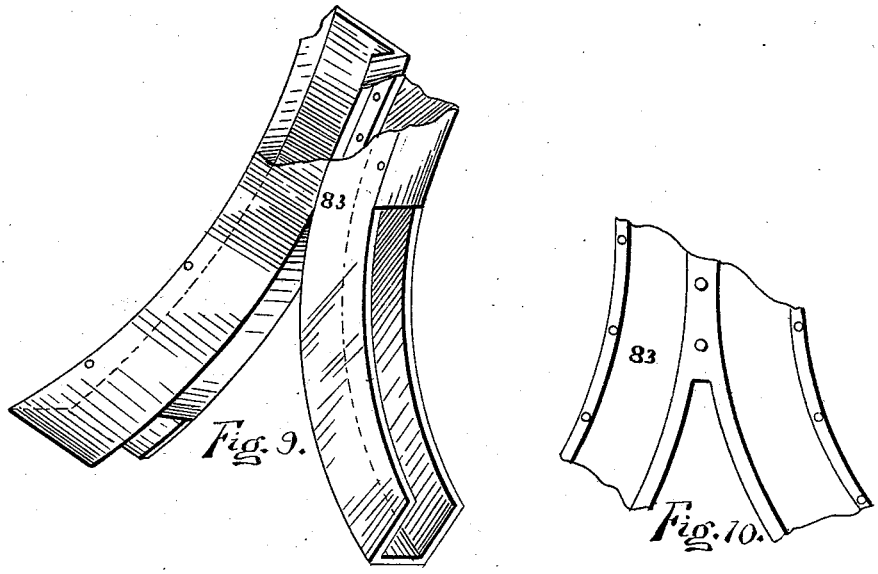
Figure 11:
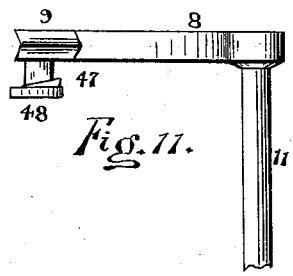
Figure 12:
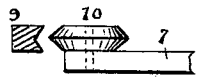
Figures 13, 14:
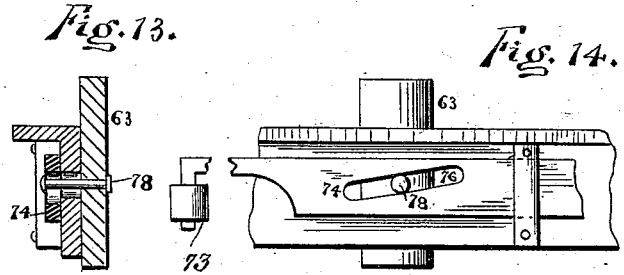

Figure 1 is a plan of a ten-block rotary machine, showing general arrangement of the working parts as viewed from the top, many of the parts being omitted for clearness of illustration. Fig. 2 is a detail elevation of the spalting-incline, showing lever connections for operating the spalter and the tilt and tilting-inclines. Fig. 3 is a detail elevation of the levers and connections for operating the spalter and tilt and tilting-inclines. Fig. 4 is a broken detail elevation of the spalt-removing device and mechanism for operating the pushing-block. Fig. 5 is a detail elevation and partial perspective of the tilt-table and connections; Fig. 6, detail elevation of the tilting-cams and their operating-levers. Fig. 7 is a detail section of the tilt-riser and its nut. Fig. 8 is a broken side elevation of the machine near sawyer's table, parts being omitted. Fig. 9 is a broken perspective view of sawdust-spout. Fig. 10 is a broken plan of spout with cover removed. Fig. 11 is an inside elevation of lever 8. Fig. 12 is a cross-section of same and elevation of pushing roller or abutment. Fig. 13 is a section through the rear arm of a carriage, showing pushing-block, pin, and slide. Fig. 14 is a rear elevation of same parts. Fig. 15 is a broken plan of the setting-levers and retaining-catch.

This machine is an improvement on my invention patented April 3, 1888, No. 380,346, to which patent reference is made for a detailed description of the working parts. In the patent referred to it is necessary for the operator in dropping a spalt from the machine to closely watch the carriage and shift the lever (170 in said patent) at such time as to produce the desired movement in its proper sequence. Again, if it is desired to shift a tilt-table, the operator has to shift the lever (104 in said patent) after the carriage has passed him and just prior to the time when the saw engages with the shingle-block. To shift the lever controlling the carriage farthest from the operator at the proper instant requires very close attention, and at the same time the carriages near at hand must be observed. To facilitate the work, in the patent referred to I show gages 221, which indicate the position of the carriage when lever 104 should be shifted.

To overcome the necessity for constant watchfulness required in the use of the patented machine referred to, I have devised improvements.

A indicates the frame of the machine. This frame supports the traveling carrier, which is in the present case a rotary carriage $b$. Carriage $b$ has openings or receptacles $c$ for shingle-bolts, ten such receptacles being a convenient number. The carriage rotates on central shaft $d$ as an axis, being supported by a spider $e$. Each block-receptacle has a block-clamping device or dog, (indicated at $f$, Fig. 1.) The mechanism $g$ $g'$, by which the dogs are loosened, is shown only once in Fig. 1; but it will be understood that such mechanism or its equivalent must be employed with each block-receptacle. A reference to the Patent No. 380,346 will make this clear, as also the position of the saws $i$, (dotted lines, Fig. 1,) tilt-tables $k$, and track or ways $m$, in relation to each other and to the carriage. I place three setting levers or handles 1 2 3 near the position of the sawyer, adjacent to table $n$. The levers 1, 2, or 3 may be operated separately, or any two or all three jointly, and have different functions. The arms or levers 1 2 3 are all pivoted on a rod or shaft 51, and can swing on said shaft as a center. The inner ends of these arms bear inclines, which may be swung into position to form abutments against which certain parts of the machine will act during the carriage movement. Thus in Fig. 1 incline 52 at the end of lever 1 is shown thrown inward toward the rim of the carriage, where it will act as hereinafter set forth. The inclines at the inner ends of levers 1 2 3 are at different elevations.

The device for dropping spalts receives its motion from an arm similar to arm described in my patent referred to. This arm 8 has an incline 9 at its outer end, which incline is engaged by roller 10 on arm 7, which is pivoted to the carriage-frame on a horizontal pivot. (See Figs. 1 and 6.) Arm 8 is attached to vertical rock-shaft 11 under the operator's table. (See Fig. 2.) This shaft 11 carries lever-arm 12, which arm is loosely pivoted to a draw-rod 13, which rod is attached to a crank on rock-shaft 14, said rock-shaft being supported in bearings under a movable section of the guideway or track. The rock-shaft 14 has upwardly-extending arms 15 and 16, which are pivotally connected to arms 17 and 18, the four arms 15, 16, 17, and 18 forming a toggle-jointed brace for the cross-bars 19 and 20, which bars support the track-sections 21 and 22, on which the bolts are supported and slide after they are undogged in the carriage. The inner ends of bars 19 and 20 are pivoted to the machine-frame at convenient points. By the outward or radial movement of arm 8 and the swing of shaft 11 and arm 12 the spalting-ways or track-sections 21 and 22 are lowered, and when a spalt or bolt rests thereon, at the time of lowering, the spalt will slide outwardly into a suitable receptacle placed to receive it. A spring 23 returns the spalting-ways to normal position to support the shingle-bolt.

Adjusting levers or trips 4, 5, and 6 are pivoted to bolt 44, which bolt is fastened to the journal 45 of arm 46, said arm being journaled in the rim of the carriage. The arm 46 extends under arm 7, and by the lifting or tilting of arm 46 the outer end of arm 7 is lifted or swung upward. A friction-spring 90 holds the arm 46 and levers 4 5 6 to adjusted position against the attraction of gravity or jar of the machine.

The leading ends of levers 4, 5, and 6 may be swung inward toward the rim of wheel $b$, the opposite ends, which have a bevel thereon, being thus thrown outward. The beveled or inclined faces of levers 4 5 6 have movement in different degrees. Thus lever 4 is limited so that it moves a little less than lever 5, and this lever 5 in turn moves a less distance than lever 6, so that the inclined surface of the latter may be protruded a greater distance than that of the former. The inward movement of the incline on lever 4 brings the outer end of said lever in position to engage incline 47 on arm 8. This incline 47 rocks arm 46 and lifts bar 7 far enough to cause roller 10 to engage incline 9 on lever 8, thus operating the spalter, as has been described in Patent No. 380,346. Incline 48, also borne by arm 8, is so located that after roller 10 shall have completed its engagement with incline 9 the incline 48 will push lever 4 back to its normal position. The incline 52 at the inner end of lever 1 is in such position (when lever 1 is shifted as in Fig. 1) as to engage the beveled short end of lever 4. This throws out the long end of the lever 4, and when the carriage moves around this lever will engage incline 47, thus lifting lever 7 and roller 10 into position to operate the spalt-dropper, as has been explained.

The face of roller 10 is V-shaped or convex, and the incline 9 is grooved or cut away to correspond, so that when the roller strikes the incline it will ride in the groove therein until the spalting movement is complete.

The incline 48 is so located that it will push the adjusting-lever 4 inwardly as soon as the roller 10 shall have made engagement with the lever 8, so that lever 4 will become inoperative until again set to trip the spalter, and as soon as roller 10 has passed out of the groove in the lever 8 the lever 7 will fall to its normal position.

To obviate the necessity of the operator's holding the lever 1 until it has performed its function, a locking-catch 55 operates to hold said lever when set. Said locking-catch 55 has a beveled face on the side toward the unlocked position of the levers. The catch 55 is pivotally attached to the machine-frame by arm 56, and is supported by connecting-rod 57 on the end of arm 58, which is attached to rock-shaft 59. On the other end of rock-shaft 59 is the upwardly-projecting arm 60, having an incline 61 on its inner face in position to engage the wheel 10 on arm 7 as it is carried past said incline during the rotation of the carriage. The rod or bolt 51 on which levers 1 2 3 are pivoted bears also an arm 62, which has a downwardly-extending projection 163. (See Figs. 2, 3, and 8.) The projection 163 engages with the levers 1, 2, and 3. The arm 62 is pressed inwardly toward the carriage-wheel by a spring or is itself a spring-arm. The arm 56, which supports locking-catch 55, has an incline 64 at a reverse angle to the inclined face of catch 55. The lower end of arm 163 rides on the incline 64.

Describing now the operation of the catch mechanism on levers 1 2 3, using lever 1 as an illustration, when the operator pulls lever 1 toward him the catch 55 is forced down by the lever 1 bearing on its inclined surface until the lever 1 passes over the apex of the catch, when the catch springs upward (propelled by a coil-spring 59⁰ on shaft 59) and holds setting-lever 1 in its outward position, thus operating the spalter, as has been explained. As roller 10 passes the incline 61 on arm 60 said incline is forced outwardly from the machine, rocking shaft 59 and thus drawing down catch 55 by means of connections 57 and 58, thus releasing lever 1 from the catch. The spring-pressed arm 62 then moves lever 1 back to its normal position, the arm 63 riding up incline 64, holding the locking-catch 55 down until it is released by drawing back one of the levers 1, 2, or 3. The release of lever 2 or 3 is effected in like manner. By holding catch 55 down, the incline 61 is held backward out of range of the operating-lever 7, and thus wear and jar are avoided.

The tilt-tables 24 and 25 are similar to each other in their construction and mode of operation. The tables are shifted by movable risers 26 and 27. (See Fig. 5.) These risers are threaded into pivoted nuts 28 and 29, which nuts have their seats in pivoted arms 30 and 31, so as to rock in said seats. Arms 30 and 31 are pivoted to the upright 33, forming part of the frame. A reciprocating slide 34 is supported in bearings on this upright 33, having inclined surfaces 32 at each end. A connecting-rod 34$^\times$ connects slide 32 with the arm 35, which is fastened to upright rock-shaft 36. The upper end of rock-shaft 36 has an arm 37, provided with an incline 38, which incline engages the roller 10 on the end of arm 7 when said arm 7 is at proper elevation. A shaft 39, parallel with shaft 37, has a gear 42 or link-coupling, which engages a corresponding gear 43 on shaft 36, thus causing the two shafts to rock in unison. Shaft 39 bears an arm 40, having an incline 41 at its end. The inclines 38 and 41 are in different horizontal planes. As the shafts 36 and 39 or their hubs are connected so as to rock together, it follows that the arm 40 will be rocked outward or radially with reference to the rotary carriage when arm 37 rocks inward toward the rim of the carriage, and vice versa. The engagement of roller 10 with incline on arm 37 by its connections through shaft 36 serves to tilt the table in one direction, while the engagement with incline on arm 40 serves to reverse the movement and tilt the table in the opposite direction. This we will suppose to be done through movement of lever 2, which serves to throw out front end of lever 5 on the carriage. Front end of lever 5 then rides up an incline 60$^\times$, just in rear of arms 40 and 37. Lever 5 is permitted to fall as soon as roller 10 is in engagement with arm 40. In similar manner the shifting of lever 3 serves to throw lever 6 into operation, and this lifts lever 7 and its wheel 10 into position to engage the arms 138 and 140 at the opposite side of the machine, thereby tilting the table 25. Arms 138 and 140 are connected to the tilt-table in similar manner to the connection described for arms 37 and 40 and are connected in similar manner to tilt-table 25.

It has been found in practice that one spalter will do very well for a ten-block machine, as there are but two saws. The tilt-tables, however, should both be under control of the operator, and this can preferably be done by use of levers 2 and 3.

It will be understood that levers 1, 2, and 3 may be shifted by foot instead of hand power by the addition of suitable treadles, or that the operator may shift levers 4, 5, and 6 directly without the intervention of the levers 1, 2, and 3. This, however, will be pointed out in another application.

Each block-receptacle will be provided with a lever 7 and engaging roller 10, so that each shingle-bolt can be controlled separately. The levers 7 and connections are omitted from a number of the block-receptacles in the drawings for convenience and clearness of illustration.

As described in my Patent No. 380,346, the shingle-bolt is carried from the saw to the following tilt-table by being pushed along by pushing-blocks 63. These blocks, preferably of wood, rest in grooves or holders in the rear face of the block-receptacles.

If the shingle-bolts are wedge-shaped or inclined on their rear faces, as frequently happens when the "wany" edge of the bolt comes next the pusher—that is, the edge of the bolt which conforms to the shape of the tree—there is a tendency for the shingle-bolts to wedge between the pushing-blocks and the supporting-ways, thus lifting the carriage, causing an undue amount of friction and sometimes accidents. To overcome this objection, I have contrived a device to drop the pushing-blocks 63 a little below the plane of the supporting-ways as soon as the shingle-bolt has passed off from the saw. The shingle-bolt is then undogged and rests on the supporting-ways, the lower ends of the pushers being below the bottom of the bolt. When the shingle-bolt is again grasped by the holding-dogs and just before the pushers reach the saw, the pushers are raised to escape the saw-teeth.

An inclined bearing-surface 66, Fig. 1, is attached to the machine-frame. This incline 66 leads to a track or way 67, concentric or parallel with the path of movement of the carriage.

68 indicates an incline the reverse of 66, and 69 a way or bearing-surface in the reverse direction to bearing 67, but also concentric with the carriage.

The inclines 70 and 72 and tracks 71 and 73 are duplicates at the other side of the machine of the inclines 66 and 68 and ways 67 and 69 and are for similar operation on the bolt-pushers in connection with the opposite saw.

A reciprocating rod 74 is carried by the saw-carriage, in connection with each bolt-receptacle, and is free to slide in direction parallel with the rear face of the bolt-receptacle. The inner end of this rod carries an antifriction-roll 75, which rides against the inclines and tracks just described, pushing the rod 74 out or in, according to the position of the carriage in its path of movement. The rod or slide 74 has two inclined slots 76 and 77, (see Fig. 4,) through which slots pins or bolts 78 and 79 pass. These pins or bolts pass through recesses in the arms of the carriage and are firmly connected to the pushing-blocks 63. By such connection the blocks 63 are raised or lowered whenever the rod 74 is moved in the direction of its length, and as this movement is controlled by the inclines 66 68, &c., the movement of block 63 up or down takes place at the proper times to prevent the catching of the bolts and also to avoid the saws. The block 63 will extend between the bolt-supporting ways when depressed.

When sawdust is thrown from the saw by centrifugal force, it takes a line tangential to the line of movement of the saw. Taking advantage of this fact, I make a double sawdust-spout 80, with open sides inclosing a segment of the saw, about from the point 81 to the point 82, in each branch thereof. I make this spout with a double center 83 and 84, Fig. 1, on which center the cover rests.

The train of mechanism 74, 78, and 63, constituting a driver for raising or lowering the blocks, can be used in my patented machine referred to and also in other machines.

In many cases other mechanism than that hereinbefore described may be substituted without departing from the general features of my invention and without further exercise of inventive faculty. Such modifications I desire to cover in the claims. Some of the devices shown in my patent referred to may be used in the machine herein described, as will be readily apparent to the skilled mechanic.

I claim—

1. A shingle-machine having a plurality of carriages in position to pass successively over the saw, a bolt-supporting way beneath said carriages, a train of adjunctive connections whereby said way may be thrown into abnormal position to drop the spalt, a trip moving with the carriage into position to actuate said train when properly set, and a movable stop outside the carriage in position to set the trip, the parts being combined and operating substantially as described.

2. In a shingle-machine of the character described, the combination of an operating-bar adjacent to the carriage in the path of movement of the trip, a movable trip connected to the moving carriage, and a spalt-dropping train of mechanism actuated by said trip, substantially as described.

3. In a shingle-sawing machine, a bar or handle adjacent to the carriage, a trip moving with the carriage in position to engage said bar when the bar is in abnormal position, a rocking lever connected to this trip, and to a movable arm carried with the carriage, and a train of adjunctive mechanism, substantially as described leading to the spalt-dropper, by which the spalt-dropper is actuated by this arm to throw out the spalt, as set forth.

4. The combination with the moving carriage and an actuating-arm having movement with said carriage, and mechanism to throw said arm into operative position, substantially as described, of a rock-shaft, an arm thereon, and a toggle-link supporting the boltway and actuated by said arm, substantially as described.

5. In a shingle-sawing machine, the combination with rotating carriage and a bolt-supporting way beneath the same, of a movable section of said way pivoted to swing into a downwardly-inclined position, and movable parts substantially as described to support the way in a horizontal position or permit it to swing on the pivots, substantially as described.

6. In a shingle-sawing machine, the combination with the traveling carriage, of a trip moving therewith, a rock-shaft and arm connected to said trip and partaking of the movement of the carriage, means for locking said shaft, thereby setting the trip, an operating-arm outside the carriage in position to be actuated by said trip, a spalt-dropper, of substantially the character described, supported independent of the carriage, and connections from the operating-arm to said spalt-dropper, substantially as set forth.

7. In a shingle-sawing machine, a traveling carriage, an arm moving synchronously therewith and capable of moving into abnormal position, a movable stop outside the carriage which may be shifted to engage with said arm and throw it into operative position, and a bearing-surface supported independently of the carriage, and in position to be engaged by said arm when so shifted, and having operative connections to the spalt-dropper, all combined substantially as described.

8. In a shingle-sawing machine, the combination with the moving carriage, of an arm connected therewith, mechanism substantially as described for moving said arm into abnormal position, and a bearing-surface outside the carriage engaging said arm, and by its engagement holding it during the engagement in its abnormal position, substantially as described.

9. In a shingle-sawing machine, the combination of a traveling carriage, an arm movably connected therewith, and having a friction-piece thereon, with an operating bearing-surface independent of the carriage having an interlocking face engaging the friction-piece to guide or hold the same, and connections from said bearing-surface to operate a moving part of the machine, (as a spalt dropper or tilter,) substantially as described.

10. In a shingle-machine, a traveling carriage, an arm movably connected therewith, a movable piece on the frame having operative connections to the tilter substantially as described, and interlocking bearing-surfaces between the arm and movable piece whereby the arm is maintained in operative engagement with the movable piece after contact is made, without other support.

11. In a shingle-machine, a plurality of levers connected to and moving synchronously with the bolt-carriage, a single operating-arm under control of each of the levers, and a plurality of engaging surfaces independent of the carriage, (connected respectively to the spalt dropper or tilter,) in position to be engaged by said arm in combination as set forth, whereby a single arm is made to control a number of attachments.

12. In a shingle-machine, a traveling carriage having a movable projecting arm, a plurality of pivotal levers hung to a rock-shaft having an arm bearing on said projecting arm, and a plurality of operating projections outside the carriage and connecting mechanism for controlling the relation of the bolt or block to the machine with which said projecting arm engages in various positions, substantially as described.

13. In a shingle-sawing machine, a moving carriage, a movable arm carried thereby in adjusted position, a rock-shaft and arm carried by said shaft in position to engage said movable arm, and a series of levers attached to said rock-shaft in position to rock it to adjusted positions, and a series of handles or stops independent of the carriage and under control of an operator, in position so that any one of the stops may be thrown in the path of movement of its corresponding lever on the carriage, to engage and shift the same, all in combination substantially as described.

14. In a shingle-sawing machine, a traveling carriage and a movable arm carried thereby, a series of levers on the carriage, each lever having an inclined surface, and all the levers supported on a shaft actuating the movable arm, as described, and separate adjustable handles on the frame, each having a stop or abutment, so that any abutment may be thrown in the path of movement of a predetermined corresponding lever and actuate the same, all substantially as described.

15. The combination with the carriage of a plurality of levers moving synchronously therewith, a single actuating-piece which may be thrown into operative position by the levers, and a plurality of tilt-tables having separate trains of operating connections outside the carriage, so that the actuating-piece may be thrown into position to actuate a selected one of the tilt-tables, substantially as described.

16. In a shingle-machine, a rotary carriage having a series of levers mounted thereon, an actuating-arm on the carriage under control of said levers so as to be thrown into engagement with the adjunctive mechanism of the machine as the carriage rotates, a series of handles or stops independent of the carriage in position to be shifted to engage the levers, and a holding-catch for retaining the handles or stops, all combined substantially as described.

17. In combination with a series of trips moving synchronously with the carriage, and operative connections therefrom controlling the relations of the blocks and machine substantially as described, a series of handles or stops outside the carriage in position to be shifted to engage the trips, a holding-catch for said handles, and a train of adjunctive mechanism substantially as described by which said catch is automatically disengaged.

18. A rotating carriage and a movable part moving therewith, connecting mechanism controlling the relation of blocks and machine a trip carried thereby, a movable handle outside the carriage having an abutment which can be shifted into the path of movement of the trip, a catch for said handle, a rock-shaft and link connected to said shaft, and a swinging arm on the rock-shaft and in the path of movement of a projection on the carriage, whereby the catch may be disengaged and the parts restored to normal position, all combined substantially as described.

19. The combination with mechanism for moving the carriage which governs mechanism controlling the relation of block and machine the series of shifting-handles in position on the frame and controlling said mechanism, of a single catch for retaining either of the handles in shifted position, a rock-shaft and a swing-arm actuated from the carriage to release the catch, and a swing-arm operating on an incline on the catch to hold the catch out of operative position, all relatively arranged substantially as and for the purpose stated.

20. In a shingle-machine having a number of synchronously-moving bolt-holding carriages, the combination with each carriage of a plurality of movable parts and a single operating-arm actuated thereby, a spalt-delivering system, and a block-tilting system outside the carriage, each in position and having connections substantially as described whereby either trip or spalter may be actuated from the same operating-arm at different periods during the movement of the carriage, substantially as described.

21. In a shingle-machine, the combination of a tilt-table, risers supporting the sides thereof as described, arms pivoted to the frame carrying pivoted nuts with which the risers have screw engagement, and a reciprocating slide having inclines which engage the pivoted arms alternately to lift one side or the other of the tilt, substantially as described.

22. In a shingle-machine, the combination of the tilt-table and adjunctive mechanism for actuating the same, with a trip moving with the carriage for actuating said tilt, and an abutment in the path of movement of the trip and under control of the operator, whereby the handle or abutment may be shifted by the operator, and the further operation of shifting the tilt-table will be automatically performed by the movement of the carriage, substantially as described.

23. The combination with the tilt-table, and a reciprocating piece having connections to actuate the tilt-table as described, of a link, a swing-arm connected to the link, a pair of rock-shafts connected to swing together in opposite directions, and arms on said shafts, one of which is thrown toward the moving carriage as the other is swung away, and a projection on the carriage in position to engage one of said arms when set to do so, substantially as described.

24. In a shingle-machine, the moving carriage and a projection therefrom adjustable to different levels, a pair of rock-shafts at the side of the carriage having arms at different levels in which the projection aforesaid will have engagement, said shafts being geared for synchronous movement, and a train of adjunctive connections from one of the shafts to the tilt-table whereby the tilt-table may be moved, all combined substantially as described.

25. The combination with the tilt-table and its connected rock-shafts each having an arm in the path of movement of a trip on the carriage, of engaging surfaces outside the carriage to guide said trip to one or the other of the arms, and a moving piece moving with the carriage and controlling the trip, substantially as described.

26. In a shingle-machine having a series of bolt-holding carriages, a tilt-table and a spalt-dropper, and adjunctive trains of mechanism for operating the tilt-tables and the spalt-dropper, a plurality of movable parts moving with the carriage and an arm (as 46) connected thereto, said movable parts being capable of movement into position to actuate said trains leading to the spalter or tilt, and a friction-spring to hold said trips in adjusted position, all combined substantially as described.

27. In a shingle-machine, a rotary traveling carriage, a track beneath said carriage, a movable section in said track pivoted at the side toward the center of the machine, and a vertical movable support toward the outside of the machine, in combination substantially as stated.

28. In a shingle-machine, a traveling carriage, pushing-blocks in the rear face of said carriage, and a driver operating on said blocks to depress the same after passing the saw.

29. In a shingle-machine, a traveling carriage, pushing-blocks in said carriage, and an automatic driver operating on said blocks to raise them on approaching the saw, substantially as described.

30. In a shingle-sawing machine, a traveling carriage, pushing-blocks in said carriage, pins connected to said blocks, and a reciprocating piece engaging said pins to alternately raise and lower the push-blocks, all combined substantially as described.

31. In a shingle-sawing machine, a rotary carriage, push-blocks in said carriage, a radially-reciprocating slide connected to said blocks, and cam-surfaces on the frame by which said slide is reciprocated, substantially as described.

32. In a shingle-sawing machine, the combination of a rotary carriage, push-blocks supported in said carriage, a radially-reciprocating slide connected to said push-blocks by pins and inclines as stated, and cam-surfaces on the frame with which said slide makes contact, substantially as set forth.

In testimony whereof I affix my signature in presence of two witnesses.

WILLIS J. PERKINS.

Witnesses:
EDWARD TAGGART,
C. W. GEO. EVERHART.